US006298348B1

(12) United States Patent
Eldering

(10) Patent No.: US 6,298,348 B1
(45) Date of Patent: Oct. 2, 2001

(54) CONSUMER PROFILING SYSTEM

(75) Inventor: Charles A. Eldering, Doylestown, PA (US)

(73) Assignee: Expanse Networks, Inc., Doylestown, PA (US)

( * ) Notice: Subject to any disclaimer, the term of this patent is extended or adjusted under 35 U.S.C. 154(b) by 0 days.

(21) Appl. No.: 09/268,519

(22) Filed: Mar. 12, 1999

Related U.S. Application Data

(63) Continuation-in-part of application No. 09/205,653, filed on Dec. 3, 1998.

(51) Int. Cl.[7] .............................. G06F 17/30; G06F 17/60; G06F 15/16
(52) U.S. Cl. ................................. 707/10; 707/4; 705/4; 705/10; 705/26; 705/36; 709/206
(58) Field of Search ........................... 705/4, 10, 14, 705/26, 36; 709/206; 707/4, 10

(56) References Cited

U.S. PATENT DOCUMENTS

| | | | |
|---|---|---|---|
| 4,546,382 | 10/1985 | McKenna et al. | 358/84 |
| 4,833,308 | 5/1989 | Humble | 235/383 |
| 4,972,504 | 11/1990 | Daniel, Jr. et al. | 455/2 |
| 5,128,752 | * 7/1992 | Vonkohorn | 705/36 |
| 5,201,010 | 4/1993 | Deaton et al. | 382/7 |
| 5,223,924 | 6/1993 | Strubbe | 358/86 |
| 5,227,874 | * 7/1993 | Von Kohorn | 705/10 |
| 5,237,620 | 8/1993 | Deaton et al. | 382/7 |
| 5,285,278 | * 2/1994 | Holman | 705/26 |
| 5,305,196 | 4/1994 | Deaton et al. | 364/401 |
| 5,327,508 | 7/1994 | Deaton et al. | 382/7 |
| 5,388,165 | 2/1995 | Deaton et al. | 382/7 |
| 5,430,644 | 7/1995 | Deaton et al. | 364/401 |
| 5,448,471 | 9/1995 | Deaton et al. | 364/401 |
| 5,592,560 | 1/1997 | Deaton et al. | 382/100 |
| 5,621,812 | 4/1997 | Deaton et al. | 382/100 |
| 5,638,457 | 6/1997 | Deaton et al. | 382/100 |

(List continued on next page.)

FOREIGN PATENT DOCUMENTS 9828906   7/1998   (WO).

OTHER PUBLICATIONS

Fortanet et al, Netvertising: Content–Based Variations in a Digital Genre, IEEE, System Sciences, Proceedings of the Thirsty–First Hawaii International Conference, vol. 2, pp. 87–96, Jan. 1998.*

Product literature, Aptex Software Inc., "SelectCast for Commerce Servers," printed from http://ww.aptex.com/products–selectcast–commerce.htm on Jun. 30, 1998; 9pp.

*Primary Examiner*—Thomas Black
*Assistant Examiner*—Frantz Coby
(74) *Attorney, Agent, or Firm*—Douglas J. Ryder

(57) ABSTRACT

A consumer profiling system is presented in which consumer profiles are formed and updated based on their purchases. The consumer profiles contain both demographic data and product preferences. Purchase records are transmitted to the consumer profiling system which updates the consumer profiles based on product characterizations which include demographic profiles of the typical purchaser of that product as well as the product brand and size. The consumer profiles can be access by advertisers who transmit information characterizing their ads. The ad information is correlated with the consumer profile to produce a measure of the applicability of the ad to that consumer. The system allows the creation of consumer profiles describing demographic and product preference information. An advantage of the system is the ability to maintain the privacy of the information while still allowing it to be accessed to match advertisements and offers to consumers. The system can be used to both increase the effectiveness and cost efficiency of advertisements, as well as for determining the price for transmitting or viewing an advertisement, based on the correlation of the ad with the consumer profile.

31 Claims, 17 Drawing Sheets

U.S. PATENT DOCUMENTS

| | | | |
|---|---|---|---|
| 5,642,485 | 6/1997 | Deaton et al. | 395/214 |
| 5,644,723 | 7/1997 | Deaton et al. | 395/14 |
| 5,649,114 | 7/1997 | Deaton et al. | 395/214 |
| 5,659,469 | 8/1997 | Deaton et al. | 395/214 |
| 5,675,662 | 10/1997 | Deaton et al. | 382/137 |
| 5,687,322 * | 11/1997 | Deaton et al. | 705/36 |
| 5,724,521 | 3/1998 | Dedrick | 395/226 |
| 5,754,939 * | 5/1998 | Herz et al. | 705/10 |
| 5,774,170 | 6/1998 | Hite et al. | 348/9 |
| 5,774,868 | 6/1998 | Cragun et al. | 705/10 |
| 5,794,210 | 8/1998 | Goldhaber et al. | 705/14 |
| 5,832,457 | 11/1998 | O'Brien et al. | 705/14 |
| 5,970,469 | 10/1999 | Scroggie et al. | 705/14 |
| 5,974,399 | 10/1999 | Giuliani et al. | 705/14 |
| 6,009,410 * | 12/1999 | Le Mole et al. | 705/14 |
| 6,014,634 | 1/2000 | Scroggie et al. | 705/14 |
| 6,026,370 | 2/2000 | Jermyn | 705/14 |
| 6,035,280 | 3/2000 | Christensen | 705/14 |
| 6,055,573 | 4/2000 | Gardenswartz et al. | 709/224 |
| 6,185,541 | 2/2001 | Scroggie et al. | 705/14 |
| 6,216,129 * | 4/2001 | Eldering | 707/10 |

* cited by examiner

```
READ POP DATA
    FOR N=1 TO M
        READ PRODUCT ID
        RETRIEVE [PRODUCT DEMOGRAPHICS VECTOR]
        RETRIEVE [DEMOGRAPHIC CHARACTERIZATION VECTOR]
        RETRIEVE [PRODUCT PREFERENCE VECTOR]
        WEIGHT = PRODUCT TOTAL PURCHASE/PRODUCT CATEGORY
                 TOTAL PURCHASE
        HOUSEHOLD DEMOGRAPHICS VECTOR =
                 (WEIGHT) * (PRODUCT DEMOGRAPHICS VECTOR) +
                 (DEMOGRAPHIC CHARACTERIZATION VECTOR)
        NORMALIZE [DEMOGRAPHIC CHARACTERIZATION VECTOR]
        STORE [DEMOGRAPHIC CHARACTERIZATION VECTOR]
        PRODUCT PREFERENCE VECTOR =
                 (WEIGHT) * PRODUCT PURCHASE VECTOR) + (PRODUCT
                 PREFERENCE VECTOR)
        NORMALIZE [PRODUCT PREFERENCE VECTOR]
        STORE [PRODUCT PREFERENCE VECTOR]
    NEXT M
```

*FIG. 6A*

```
READ [AD DEMOGRAPHIC VECTOR]
READ [AD PRODUCT CATEGORY, AD PRODUCT PREFERENCE VECTOR]
RETRIEVE [DEMOGRAPHIC CHARACTERIZATION VECTOR]
RETRIEVE [PRODUCT PREFERENCE VECTOR (PRODUCT CATEGORY)]
DEMOGRAPHIC CORRELATION = CORRELATE [DEMOGRAPHIC
    CHARACTERIZATION VECTOR, AD DEMOGRAPHIC VECTOR]
PRODUCT PREFERENCE CORRELATION = CORRELATE [AD PRODUCT
    PREFERENCE VECTOR, PRODUCT PREFERENCE VECTOR]
RETURN [DEMOGRAPHIC CORRELATION]
RETURN [PRODUCT PREFERENCE CORRELATION]
```

*FIG. 6B*

PRODUCT DEMOGRAPHICS VECTOR

PRODUCT ID

| HOUSEHOLD INCOME | ≤20K | 0.2 |
| HOUSEHOLD INCOME | 20-40K | 0.3 |
| ... | | |
| HOUSEHOLD SIZE | 0-2 | 0.1 |
| HOUSEHOLD SIZE | 2-4 | 0.3 |

PRODUCT CHARACTERISTICS

PRODUCT ID: 2597251
BRAND: KELLOGG'S CORN FLAKES
SIZE: 32 OZ
PRICE: $2.69

PRODUCT DEMOGRAPHICS RULES

| MONTHLY QUANTITY OF DIAPERS PURCHASED | ESTIMATED HOUSEHOLD SIZE | ESTIMATED # OF CHILDREN <5 |
|---|---|---|
| >300 | >5 | ≥3 |
| 150-300 | 3-5 | 2-3 |
| 50-150 | 3-4 | 1-2 |
| 1-50 | 3-4 | 1 |

HEURISTIC RULES

FIG. 7

CONSUMER PROFILING SYSTEM

This application is a continuation-in-part of co-pending U.S. patent application Ser. No. 09/205,653 filed on Dec. 3, 1998, now pending.

BACKGROUND OF THE INVENTION

The advent of the Internet has resulted in the ability to communicate data across the globe instantaneously, and will allow for numerous new applications which enhance consumer's lives. One of the enhancements which can occur is the ability for the consumer to receive advertising which is relevant to their lifestyle, rather than a stream of ads determined by the program they are watching. Such "targeted ads" can potentially reduce the amount of unwanted information which consumers receive in the mail, during television programs, and when using the Internet.

From an advertiser's perspective the ability to target ads can be beneficial since they have some confidence that their ad will at least be determined relevant by the consumer, and therefore will not be found annoying because it is not applicable to their lifestyle.

In order to determine the applicability of an advertisement to a consumer, it is necessary to know something about their lifestyle, and in particular to understand their demographics (age, household size, income). In some instances it is useful to know their particular purchasing habits. As an example, a vendor of soups would like to know which consumers are buying their competitor's soup, so that they can target ads at those consumers in an effort to convince them to switch brands. That vendor will probably not want to target loyal customers, although for a new product introduction the strategy may be to convince loyal customers to try the new product. In both cases it is extremely useful for the vendor to be able to determine what brand of product the consumer presently purchases.

There are several difficulties associated with the collection, processing, and storage of consumer data. First, collecting consumer data and determining the demographic parameters of the consumer can be difficult. Surveys can be performed, and in some instances the consumer will willingly give access to normally private data including family size, age of family members, and household income. In such circumstances there generally needs to be an agreement with the consumer regarding how the data will be used. If the consumer does not provide this data directly, the information must be "mined" from various pieces of information which are gathered about the consumer, typically from specific purchases.

Once data is collected, usually from one source, some type of processing can be performed to determine a particular aspect of the consumer's life. As an example, processing can be performed on credit data to determine which consumers are a good credit risk and have recently applied for credit. The resulting list of consumers can be solicited, typically by direct mail.

Although information such as credit history is stored on multiple databases, storage of other information such as the specifics of grocery purchases is not typically performed. Even if each individual's detailed list of grocery purchases was recorded, the information would be of little use since it would amount to nothing more than unprocessed shopping lists.

Privacy concerns are also an important factor in using consumer purchase information. Consumers will generally find it desirable that advertisements and other information is matched with their interests, but will not allow indiscriminate access to their demographic profile and purchase records.

The Internet has spawned the concept of "negatively priced information" in which consumers can be paid to receive advertising. Paying consumers to watch advertisements can be accomplished interactively over the Internet, with the consumer acknowledging that they will watch an advertisement for a particular price. Previously proposed schemes such as that described in U.S. Pat. No. 5,794,210, entitled "Attention Brokerage," of which A. Nathaniel Goldhaber and Gary Fitts are the inventors, describe such a system, in which the consumer is presented with a list of advertisements and their corresponding payments. The consumer chooses from the list and is compensated for viewing the advertisement. The system requires real-time interactivity in that the viewer must select the advertisement from the list of choices presented.

The ability to place ads to consumers and compensate them for viewing the advertisements opens many possibilities for new models of advertising. However, it is important to understand the demographics and product preferences of the consumer in order to be able to determine if an advertisement is appropriate.

For the foregoing reasons, there is a need for a consumer profiling system which can profile the consumer, provide access to the consumer profile in a secure manner, and return a measurement of the potential applicability of an advertisement.

SUMMARY OF THE INVENTION

The present invention supports the receipt of consumer purchase information with which consumer characterization vectors are updated based on product characterization information. The consumer characterization vectors include a consumer demographic vector which provides a probabilistic measure of the demographics of the consumer, and a product preference vector which describes which products the consumer has typically purchased in the past, and therefore is likely to purchase in the future. The product characterization information includes vector information which represents probabilistic determinations of the demographics of purchasers of an item, heuristic rules which can be applied to probabilistically describe the demographics of the consumer based on that purchase, and a vector representation of the purchase itself.

In a preferred embodiment a computer-readable detailed purchase record is received, along with a unique consumer identifier. A demographic characterization vector corresponding to the consumer can be retrieved. In the event that there is no existing demographic characterization vector for that consumer, a new demographic characterization vector can be created. In a preferred embodiment the new demographic characterization vector contains no information. A set of heuristic rules is retrieved and contains a probabilistic measure of the demographic characteristics of a typical purchaser of an item. A new demographic characterization vector is calculated based on the purchase, the existing demographic characterization vector, and the heuristic rules.

In a preferred embodiment the calculation of the demographic characterization vector is performed by calculating a weighted average of a product demographics vector and the existing demographic characterization vector. A weighting factor is used in which the weighting factor is determined based on the ratio of the current product purchase amount to a cumulative product purchase amount. The cumulative product purchase amount can be measured as the amount spent on a particular category of items (e.g. groceries, clothes, accessories) over a given period of time such as one month or one year.

In a preferred embodiment the heuristic rules are in the form of a product demographics vector which states the demographics of known purchasers of an item. Each product can have an associated product demographics vector.

The present invention can be used to develop product preference descriptions of consumers which describe the brand and size product that they purchase, and which provide a probabilistic interpretation of the products they are likely to buy in the future. The product preference description can be generated by creating a weighted average of an existing product preference vector describing the consumer's historical product preferences (type of product, brand, and size) and the characteristics of recent purchases.

The present invention can be realized as a data processing system or computer program which processes consumer purchase records and updates their demographic and product preference profiles based on the use of product characterization information. The data processing system can also be used to receive information regarding an advertisement and to perform a correlation between the advertisement and the consumer's demographic and product preferences.

The present invention can be realized as software resident on one or more computers. The system can be realized on an individual computer which receives information regarding consumer purchases, or can be realized on a network of computers in which portions of the system are resident on different computers.

One advantage of the present invention is that it allows consumer profiles to be updated automatically based on their purchases, and forms a description of the consumer including demographic characteristics and product preferences. This description can be used by advertisers to determine the suitability of advertisements to the consumer. Consumers benefit from the system since they will receive advertisements which are more likely to be applicable to them.

The present invention can be used to profile consumers to support the correlation of an advertisement characterization vector associated with an advertisement with the consumer characterization vector to determine the applicability of the advertisement to the consumer.

Another feature of the present invention is the ability to price access to the consumer based on the degree of correlation of an advertisement with their profile. If an advertisement is found to be very highly correlated with a consumer's demographics and product preferences, a relatively high price can be charged for transmitting the advertisement to the consumer. From the consumer's perspective, if the correlation between the advertisement and the consumer's demographics or product preferences is high the consumer can charge less to view the ad, since it is likely that is will be of interest.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIGS. 6A and 6B illustrate pseudocode updating the characteristics vectors and for a correlation operation respectively;

FIG. 7 illustrates heuristic rules;

DETAILED DESCRIPTION OF THE PREFERRED EMBODIMENT

Figure 1A:
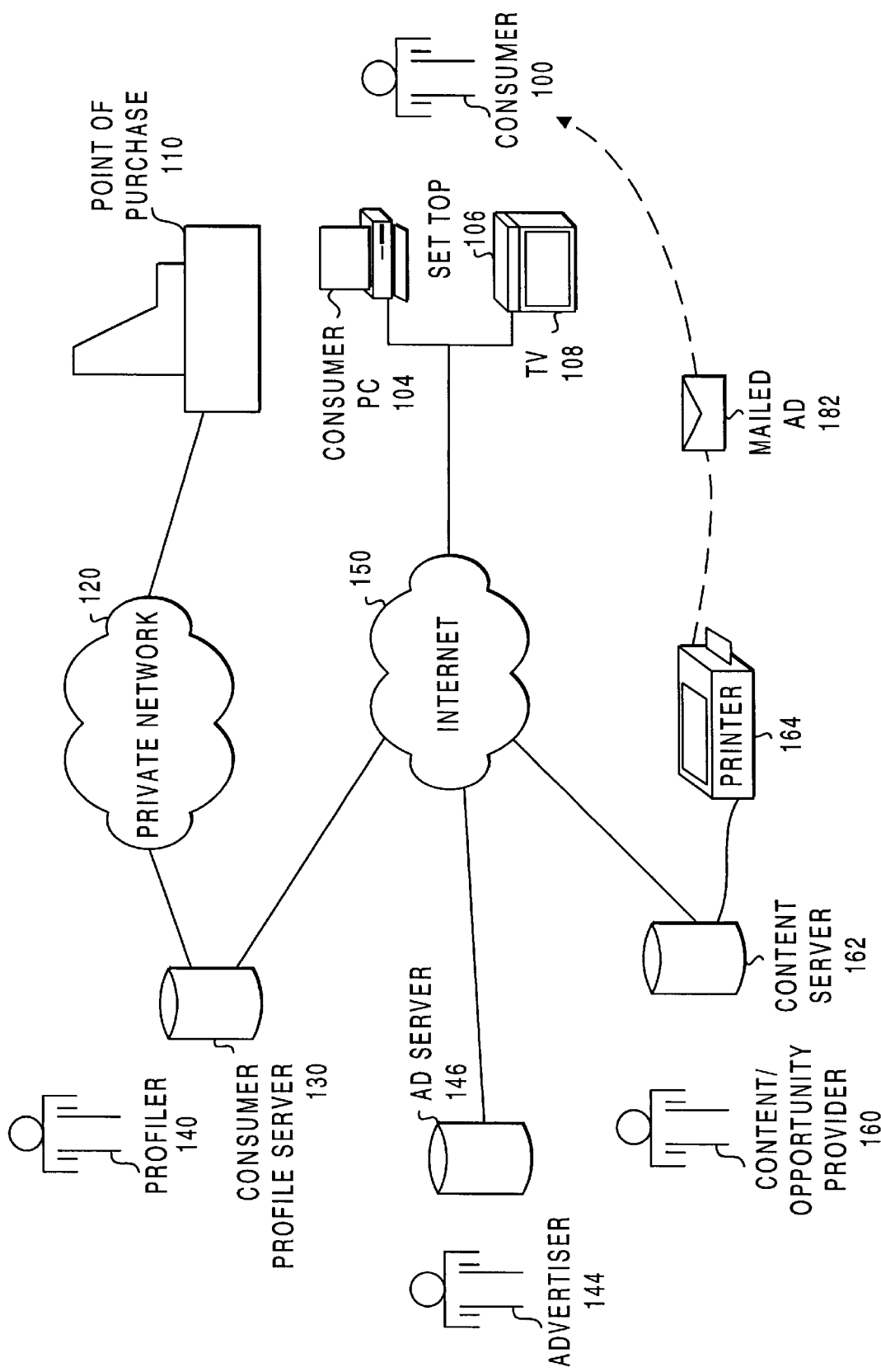
FIGS. 1A and 1B show user relationship diagrams for the present invention.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 10 in particular, the method and apparatus of the present invention is disclosed.

FIG. 1A shows a user relationship diagram which illustrates the relationships between a consumer profiling system and various entities. As can be seen in FIG. 1, a consumer 100 can receive information and advertisements from a consumer personal computer (PC) 104, displayed on a television 108 which is connected to a settop 106, or can receive a mailed ad 182.

Advertisements and information displayed on consumer PC 104 or television 108 can be received over an Internet 150, or can be received over the combination of the Internet 150 with another telecommunications access system. The telecommunications access system can include but is not limited to cable TV delivery systems, switched digital video access systems operating over telephone wires, microwave telecommunications systems, or any other medium which provides connectivity between the consumer 100 and a content server 162 and ad server 146.

A content/opportunity provider 160 maintains the content server 162 which can transmit content including broadcast programming across a network such as the Internet 150. Other methods of data transport can be used including private data networks and can connect the content sever 160 through an access system to a device owned by consumer 100.

Content/opportunity provider 160 is termed such since if consumer 100 is receiving a transmission from content server 162, the content/opportunity provider can insert an advertisement. For video programming, content/opportunity provider is typically the cable network operator or the source of entertainment material, and the opportunity is the ability to transmit an advertisement during a commercial break.

The majority of content that is being transmitted today is done so in broadcast form, such as broadcast television programming (broadcast over the air and via cable TV networks), broadcast radio, and newspapers. Although the interconnectivity provided by the Internet will allow consumer specific programming to be transmitted, there will still be a large amount of broadcast material which can be sponsored in part by advertising. The ability to insert an advertisement in a broadcast stream (video, audio, or mailed) is an opportunity for advertiser 144. Content can also be broadcast over the Internet and combined with existing video services, in which case opportunities for the insertion of advertisements will be present.

Although FIG. 1A represents content/opportunity provider 160 and content server 162 as being independently connected to Internet 150, with the consumer's devices also being directly connected to the Internet 150, the content/opportunity provider 160 can also control access to the subscriber. This can occur when the content/opportunity provider is also the cable operator or telephone company. In such instances, the cable operator or telephone company can be providing content to consumer 100 over the cable operator/telephone company access network. As an example, if the cable operator has control over the content being transmitted to the consumer 100, and has programmed times for the insertion of advertisements, the cable operator is considered to be a content/opportunity provider 160 since the cable operator can provide advertisers the opportunity to access consumer 100 by inserting an advertisement at the commercial break.

In a preferred embodiment of the present invention, a pricing policy can be defined. The content/opportunity provider 160 can charge advertiser 144 for access to consumer 100 during an opportunity. In a preferred embodiment the price charged for access to consumer 100 by content/opportunity provider varies as a function of the applicability of the advertisement to consumer 100. In an alternate embodiment consumer 100 retains control of access to the profile and charges for viewing an advertisement.

The content provider can also be a mailing company or printer which is preparing printed information for consumer 100. As an example, content server 162 can be connected to a printer 164 which creates a mailed ad 182 for consumer 100. Alternatively, printer 164 can produce advertisements for insertion into newspapers which are delivered to consumer 100. Other printed material can be generated by printer 162 and delivered to consumer 100 in a variety of ways.

Advertiser 144 maintains an ad server 146 which contains a variety of advertisements in the form of still video which can be printed, video advertisements, audio advertisements, or combinations thereof.

Profiler 140 maintains a consumer profile server 130 which contains the characterization of consumer 100. The consumer profiling system is operated by profiler 140, who can use consumer profile server 130 or another computing device connected to consumer profile server 130 to profile consumer 100.

Data to perform the consumer profiling is received from a point of purchase 110. Point of purchase 110 can be a grocery store, department store, other retail outlet, or can be a web site or other location where a purchase request is received and processed. In a preferred embodiment, data from the point of purchase is transferred over a public or private network 120, such as a local area network within a store or a wide area network which connects a number of department or grocery stores. In an alternate embodiment the data from point of purchase 110 is transmitted over the Internet 150 to profiler 140.

Profiler 140 may be a retailer who collects data from its stores, but can also be a third party who contracts with consumer 100 and the retailer to receive point of purchase data and to profile the consumer 100. Consumer 100 may agree to such an arrangement based on the increased convenience offered by targeted ads, or through a compensation arrangement in which they are paid on a periodic basis for revealing their specific purchase records.

Consumer profile server 130 can contain a consumer profile which is determined from observation of the consumer's viewing habits on television 108 or consumer PC 104. A method and apparatus for determining demographic and product preference information based on the consumer's use of services such as cable television and Internet access is described in the co-pending application entitled "Subscriber characterization system," filed on Dec. 3, 1998, with Ser. No. 09/204,888 and in the co-pending application entitled "Client-server based subscriber characterization system," filed on Dec. 3, 1998, with Ser. No. 09/205,653, both of which are incorporated herein by reference but which are not admitted to be prior art. When used herein, the term consumer characterization vector also represents the subscriber characterization vector described in the aforementioned applications. Both the consumer characterization vector and the subscriber characterization vector contain demographic and product preference information which is related to consumer 100.

Figure 1B:
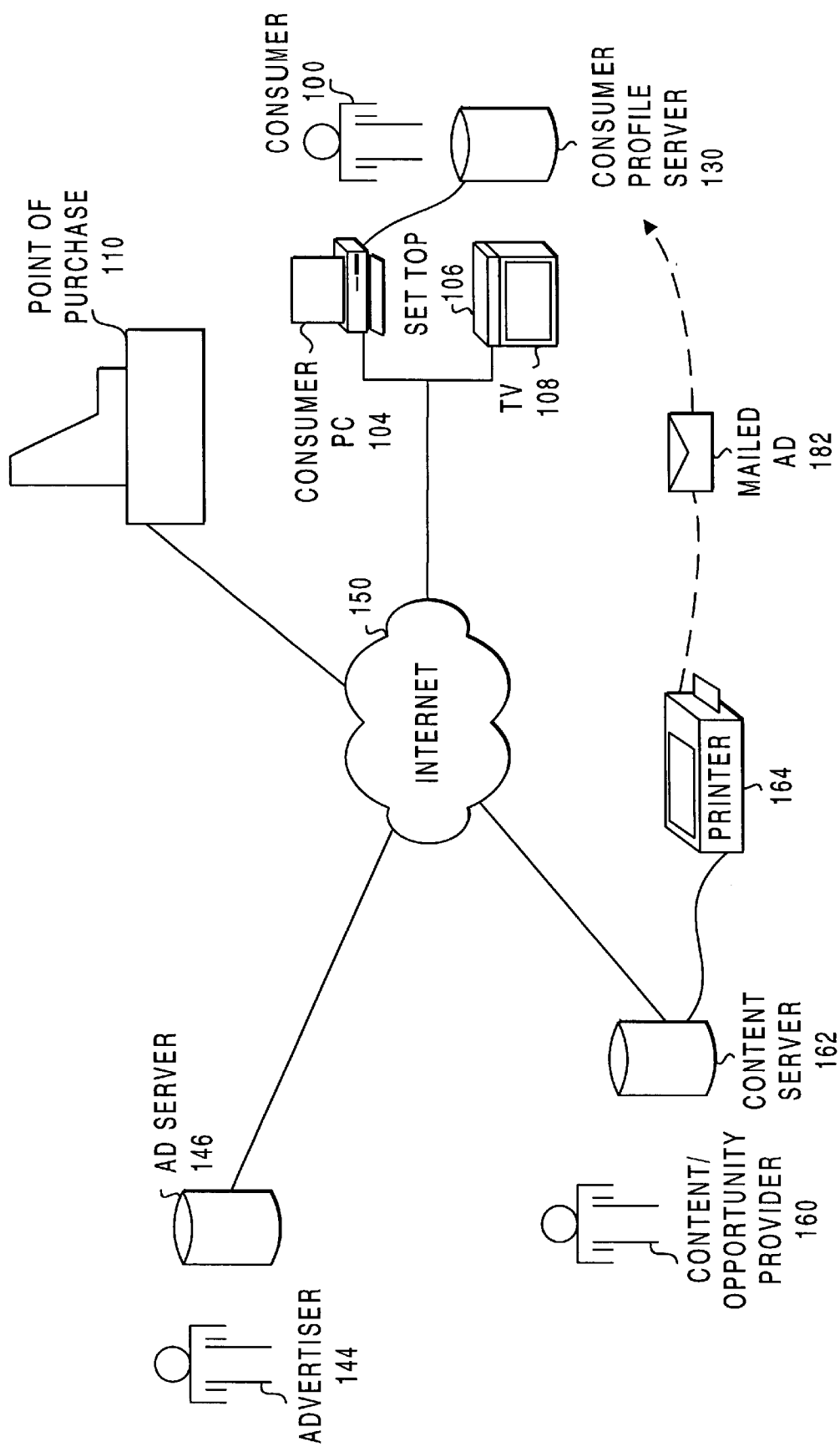

FIG. 1B illustrates an alternate embodiment of the present invention in which the consumer 100 is also profiler 140. Consumer 100 maintains consumer profile server 130 which is connected to a network, either directly or through consumer PC 104 or settop 106. Consumer profile server 130 can contain the consumer profiling system, or the profiling can be performed in conjunction with consumer PC 104 or settop 106. A subscriber characterization system which monitors the viewing habits of consumer 100 can be used in conjunction with the consumer profiling system to create a more accurate consumer profile.

When the consumer 100 is also the profiler 140, as shown in FIG. 1B, access to the consumer demographic and product preference characterization is controlled exclusively by consumer 100, who will grant access to the profile in return for receiving an increased accuracy of ads, for cash compensation, or in return for discounts or coupons on goods and services.

Figure 2A:
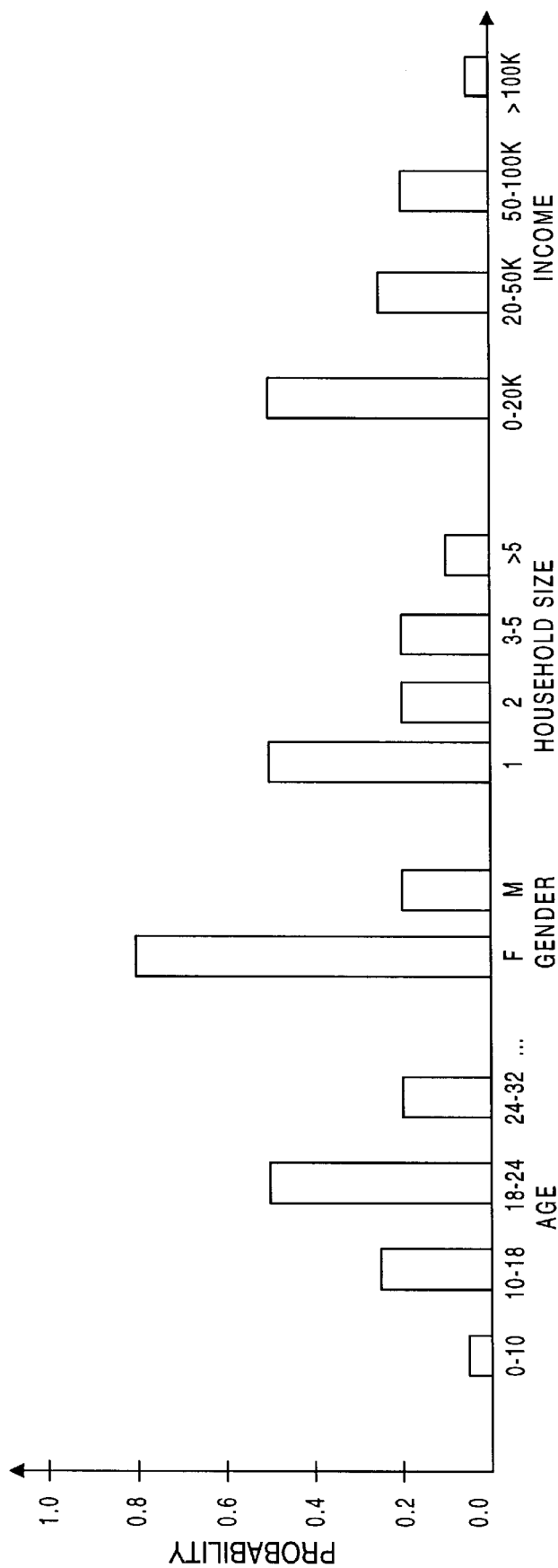
FIGS. 2A, 2B, 2C and 2D illustrate a probabilistic consumer demographic characterization vector, a deterministic consumer demographic characterization vector, a consumer product preference characterization vector, and a storage structure for consumer characterization vectors respectively.

FIG. 2A illustrates an example of a probabilistic demographic characterization vector. The demographic characterization vector is a representation of the probability that a consumer falls within a certain demographic category such as an age group, gender, household size, or income range.

In a preferred embodiment the demographic characterization vector includes interest categories. The interest categories may be organized according to broad areas such as music, travel, and restaurants. Examples of music interest categories include country music, rock, classical, and folk. Examples of travel categories include "travels to another state more than twice a year," and "travels by plane more than twice a year."

Figure 2B:
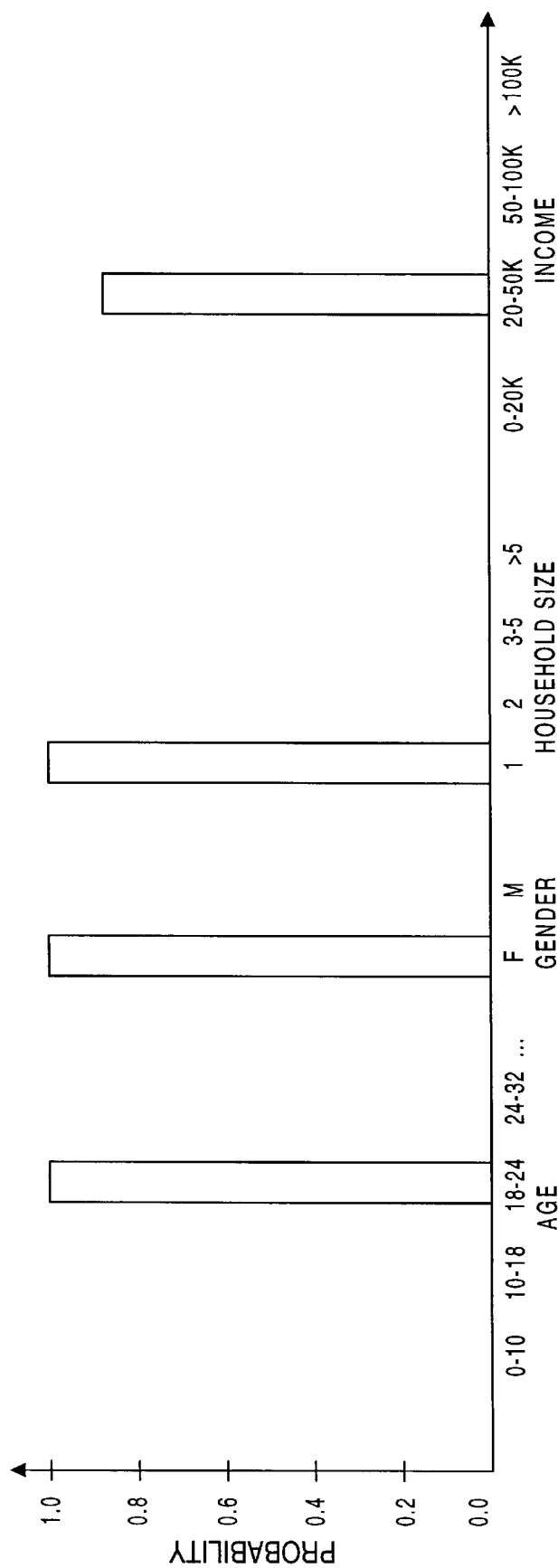

FIG. 2B illustrates a deterministic demographic characterization vector. The deterministic demographic characterization vector is a representation of the consumer profile as determined from deterministic rather than probabilistic data. As an example, if consumer 100 agrees to answer specific questions regarding age, gender, household size, income, and interests the data contained in the consumer characterization vector will be deterministic.

As with probabilistic demographic characterization vectors, the deterministic demographic characterization vector can include interest categories. In a preferred embodiment, consumer 100 answers specific questions in a survey generated by profiler 140 and administered over the phone, in written form, or via the Internet 150 and consumer PC 104. The survey questions correspond either directly to the elements in the probabilistic demographic characterization vector, or can be processed to obtain the deterministic results for storage in the demographic characterization vector.

Figure 2C:
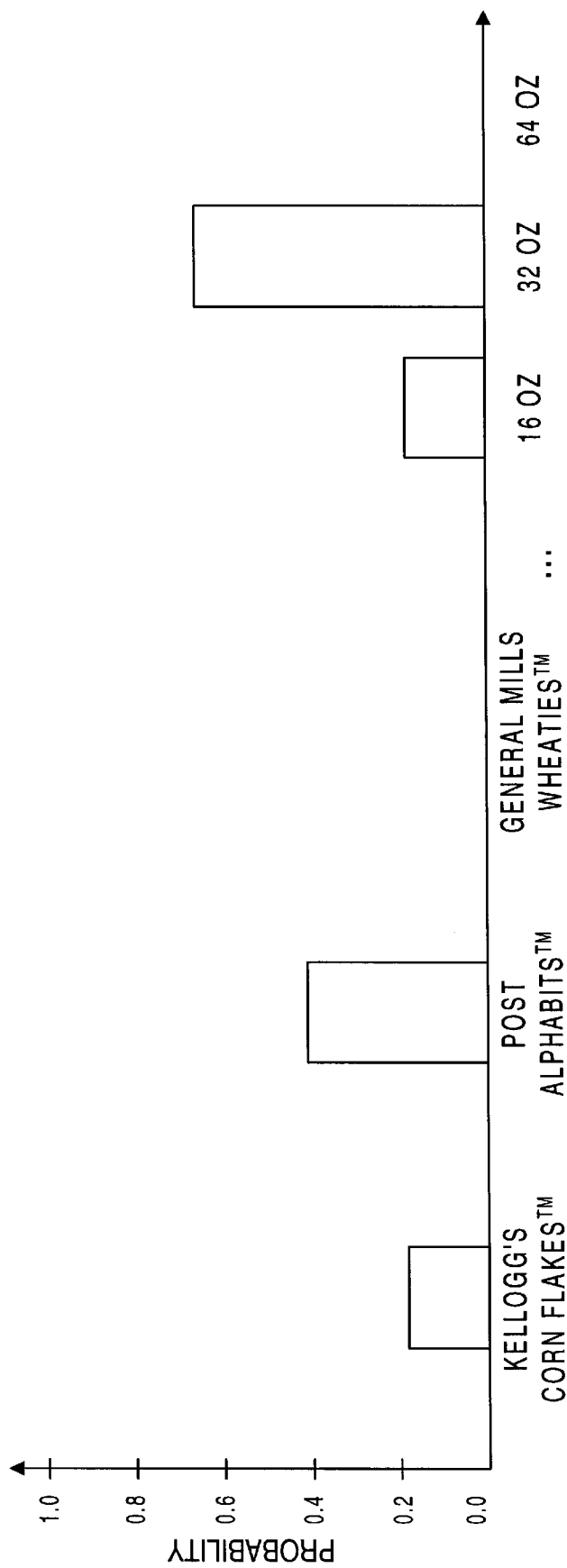

FIG. 2C illustrates a product preference vector. The product preference represents the average of the consumer preferences over past purchases. As an example, a consumer who buys the breakfast cereal manufactured by Post under the trademark ALPHABITS about twice as often as purchasing the breakfast cereal manufactured by Kellogg under the trademark CORN FLAKES, but who never purchases breakfast cereal manufactured by General Mills under the trademark WHEATIES, would have a product preference characterization such as that illustrated in FIG. 2C. As shown in FIG. 2C, the preferred size of the consumer purchase of a particular product type can also be represented in the product preference vector.

Figure 2D:
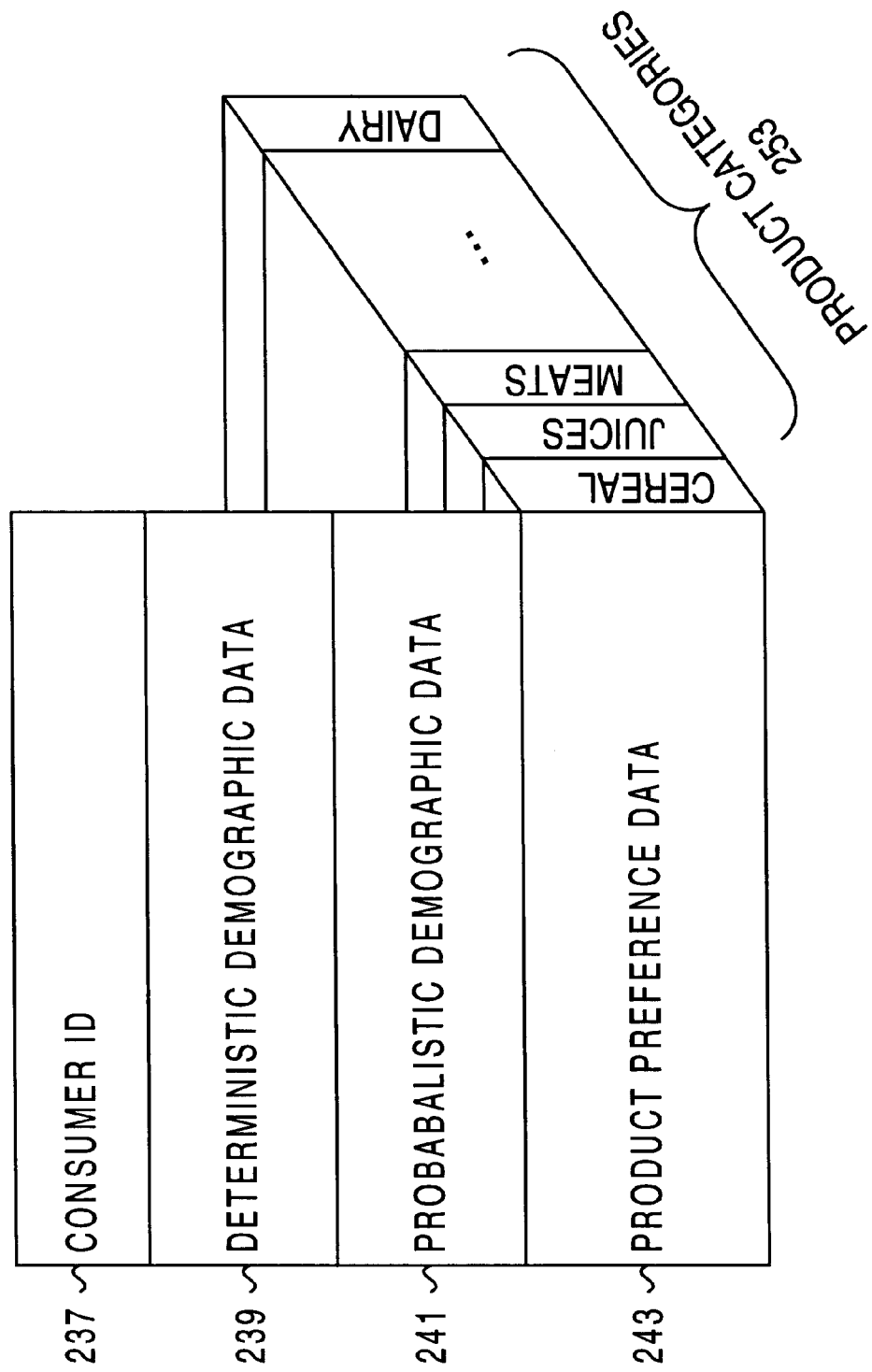

FIG. 2D represents a data structure for storing the consumer profile, which can be comprised of a consumer ID field 237, a deterministic demographic data field 239, a probabilistic demographic data field 241, and one or more product preference data fields 243. As shown in FIG. 2D, the product preference data field 243 can be comprised of multiple fields arranged by product categories 253.

Depending on the data structure used to store the information contained in the vector, any of the previously mentioned vectors may be in the form of a table, record, linked tables in a relational database, series of records, or a software object.

The consumer ID 512 can be any identification value uniquely associated with consumer 100. In a preferred embodiment consumer ID 512 is a telephone number, while in an alternate embodiment consumer ID 512 is a credit card number. Other unique identifiers include consumer name with middle initial or a unique alphanumeric sequence, the consumer address, social security number.

The vectors described and represented in FIGS. 2A–C form consumer characterization vectors that can be of varying length and dimension, and portions of the characterization vector can be used individually. Vectors can also be concatenated or summed to produce longer vectors which provide a more detailed profile of consumer 100. A matrix representation of the vectors can be used, in which specific elements, such a product categories 253, are indexed. Hierarchical structures can be employed to organize the vectors and to allow hierarchical search algorithms to be used to locate specific portions of vectors.

Figure 3A:
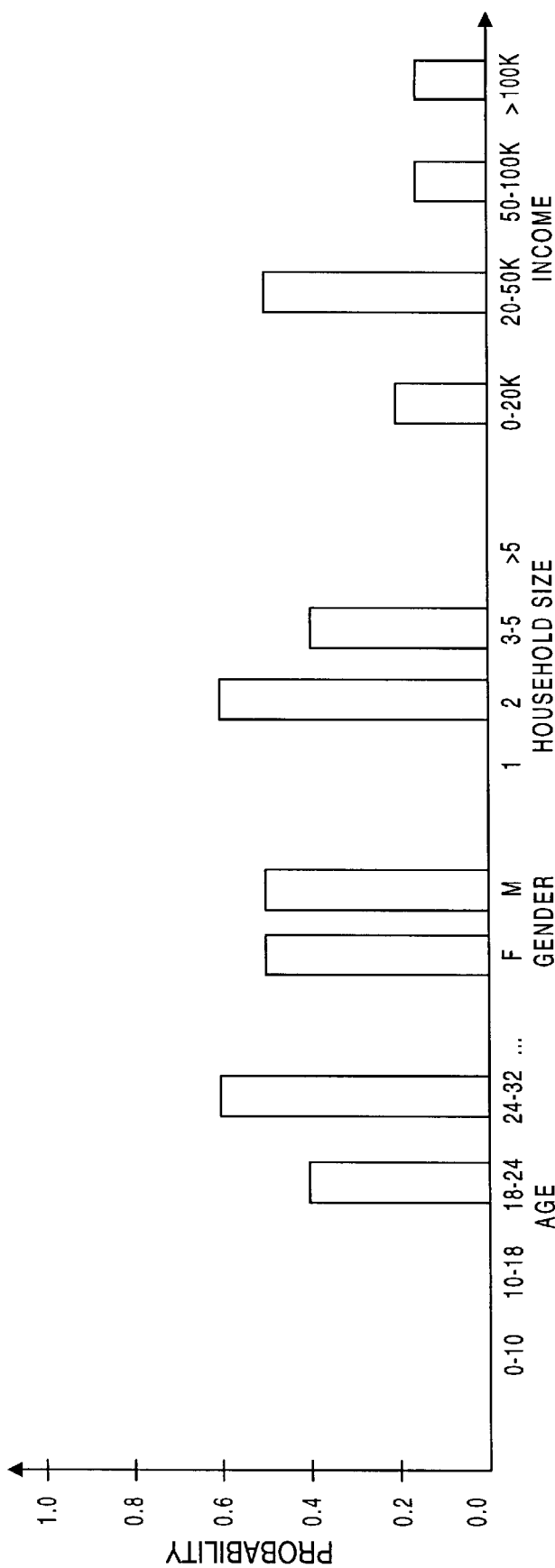
FIGS. 3A and 3B illustrate an advertisement demographic characterization vector and an advertisement product preference characterization vector respectively.
Figure 3B:
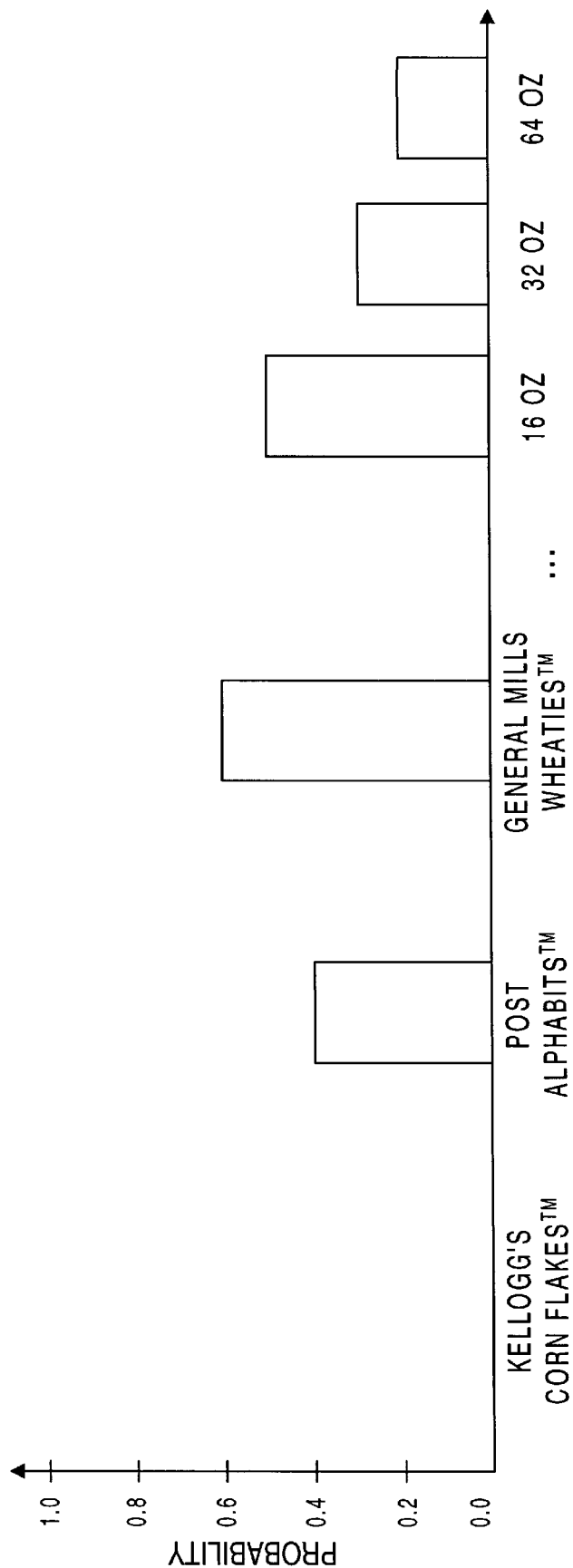

FIGS. 3A and 3B represent an ad demographics vector and an ad product preference vector respectively. The ad demographics vector, similar in structure to the demographic characterization vector, is used to target the ad by setting the demographic parameters in the ad demographics vector to correspond to the targeted demographic group. As an example, if an advertisement is developed for a market which is the 18–24 and 24–32 age brackets, no gender bias, with a typical household size of 2–5, and income typically in the range of $20,000–$50,000, the ad demographics vector would resemble the one shown in FIG. 3A. The ad demographics vector represents a statistical estimate of who the ad is intended for, based on the advertisers belief that the ad will be beneficial to the manufacturer when viewed by individuals in those groups. The benefit will typically be in the form of increased sales of a product or increased brand recognition. As an example, an "image ad" which simply shows an artistic composition but which does not directly sell a product may be very effective for young people, but may be annoying to older individuals. The ad demographics vector can be used to establish the criteria which will direct the ad to the demographic group of 18–24 year olds.

FIG. 3B illustrates an ad product preference vector. The ad product preference vector is used to select consumers which have a particular product preference. In the example illustrated in FIG. 3B, the ad product preference vector is set so that the ad can be directed at purchasers of ALPHABITS and WHEATIES, but not at purchasers of CORN FLAKES. This particular setting would be useful when the advertiser represents Kellogg and is charged with increasing sales of CORN FLAKES. By targeting present purchasers of ALPHABITS and WHEATIES, the advertiser can attempt to sway those purchasers over to the Kellogg brand and in particular convince them to purchase CORN FLAKES. Given that there will be a payment required to present the advertisement, in the form of a payment to the content/opportunity provider 160 or to the consumer 100, the advertiser 144 desires to target the ad and thereby increase its cost effectiveness.

In the event that advertiser 144 wants to reach only the purchasers of Kellogg's CORN FLAKES, that category would be set at a high value, and in the example shown would be set to 1. As shown in FIG. 3B, product size can also be specified. If there is no preference to size category the values can all be set to be equal. In a preferred embodiment the values of each characteristic including brand and size are individually normalized.

In a preferred embodiment the consumer characterization vectors shown in FIGS. 2A–C and the ad characterization vectors represented in FIGS. 3A and 3B have a standardized format, in which each demographic characteristic and product preference is identified by an indexed position. In a preferred embodiment the vectors are singly indexed and thus represent coordinates in n-dimensional space, with each dimension representing a demographic or product preference characteristic. In this embodiment a single value represents one probabilistic or deterministic value (e.g. the probability that the consumer is in the 18–24 year old age group, or the weighting of an advertisement to the age group).

In an alternate embodiment a group of demographic or product characteristics forms an individual vector. As an example, age categories can be considered a vector, with each component of the vector representing the probability that the consumer is in that age group. In this embodiment each vector can be considered to be a basis vector for the description of the consumer or the target ad. The consumer or ad characterization is comprised of a finite set of vectors in a vector space that describes the consumer or advertisement.

Figure 4:
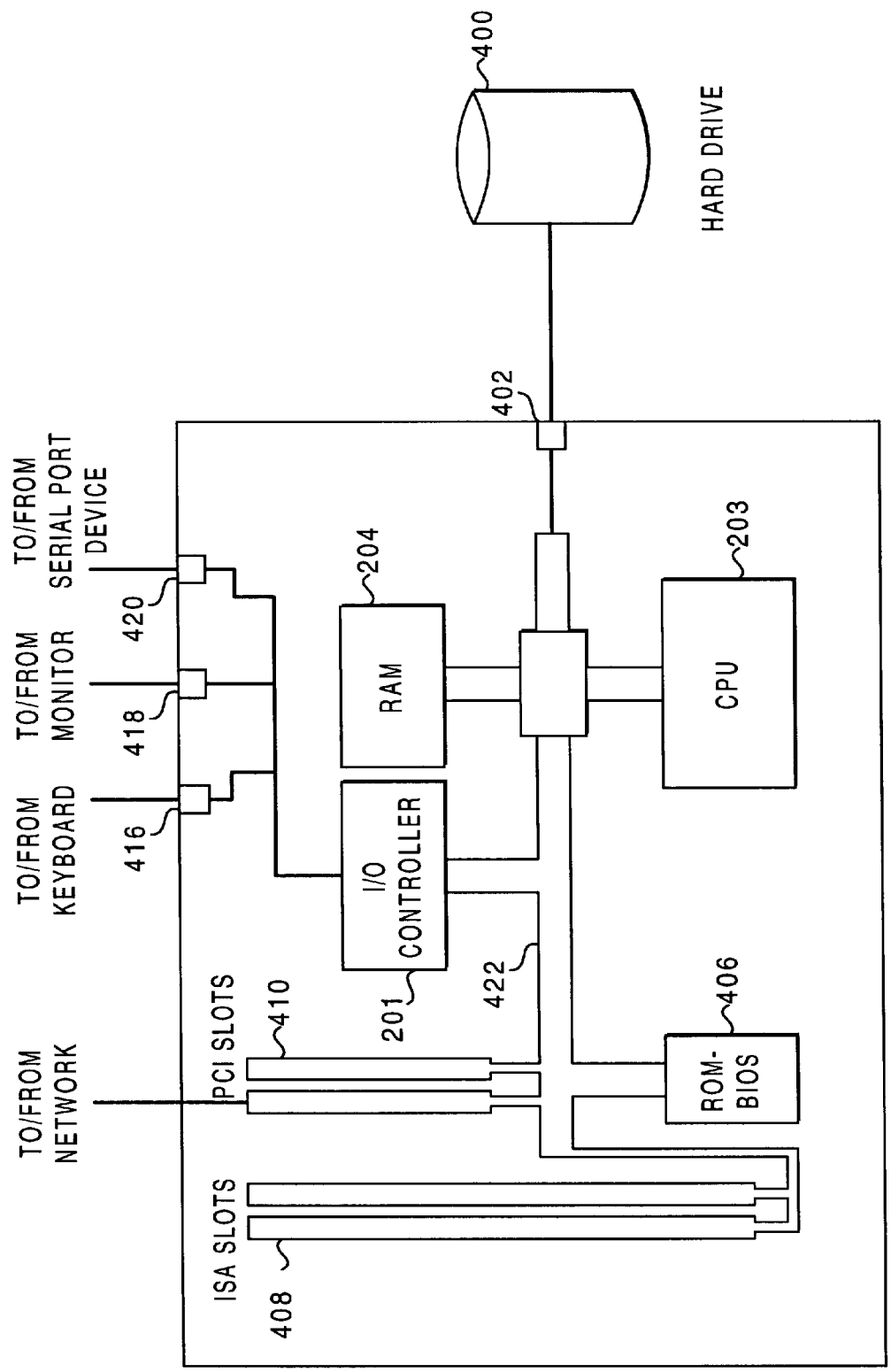
FIG. 4 illustrates a computer system on which the present invention can be realized.

FIG. 4 shows the block diagram of a computer system for a realization of the consumer profiling system. A system bus 422 transports data amongst the CPU 203, the RAM 204, Read Only Memory—Basic Input Output System (ROM-BIOS) 406 and other components. The CPU 202 accesses a hard drive 400 through a disk controller 402. The standard input/output devices are connected to the system bus 422 through the I/O controller 201. A keyboard is attached to the I/O controller 201 through a keyboard port 416 and the monitor is connected through a monitor port 418. The serial port device uses a serial port 420 to communicate with the I/O controller 201. Industry Standard Architecture (ISA) expansion slots 408 and Peripheral Component Interconnect (PCI) expansion slots 410 allow additional cards to be placed into the computer. In a preferred embodiment, a network card is available to interface a local area, wide area, or other network. The computer system shown in FIG. 4 can be part of consumer profile server 130, or can be a processor present in another element of the network.

Figure 5:
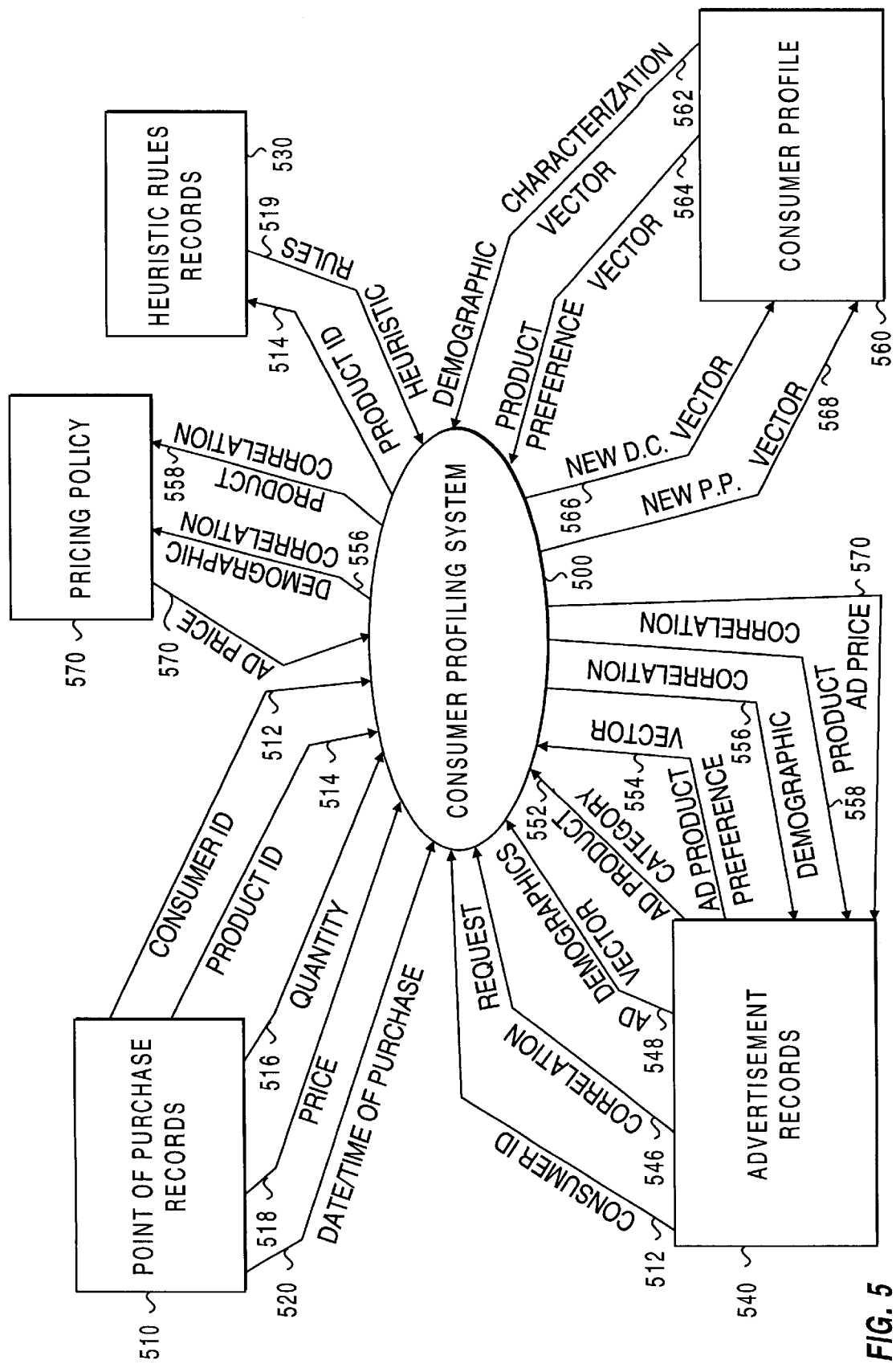
FIG. 5 illustrates a context diagram for the present invention.

FIG. 5 shows a context diagram for the present invention. Context diagrams are useful in illustrating the relationship between a system and external entities. Context diagrams can be especially useful in developing object oriented implementations of a system, although use of a context diagram does not limit implementation of the present invention to any particular programming language. The present invention can be realized in a variety of programming languages including but not limited to C, C++, Smalltalk, Java, Perl, and can be developed as part of a relational database. Other languages and data structures can be utilized to realize the present invention and are known to those skilled in the art.

Referring to FIG. 5, in a preferred embodiment consumer profiling system 500 is resident on consumer profile server 130. Point of purchase records 510 are transmitted from point of purchase 110 and stored on consumer profile server 130. Heuristic rules 530, pricing policy 570, and consumer profile 560 are similarly stored on consumer profile server 130. In a preferred embodiment advertisement records 540 are stored on ad server 146 and connectivity between advertisement records 540 and consumer profiling system 500 is via the Internet or other network.

In an alternate embodiment the entities represented in FIG. 5 are located on servers which are interconnected via the Internet or other network.

Consumer profiling system 500 receives purchase information from a point of purchase, as represented by point of purchase records 510. The information contained within the point of purchase records 510 includes a consumer ID 512, a product ID 514 of the purchased product, the quantity 516 purchased and the price 518 of the product. In a preferred embodiment, the date and time of purchase 520 are transmitted by point of purchase records 510 to consumer profiling system 500.

The consumer profiling system 500 can access the consumer profile 560 to update the profiles contained in it. Consumer profiling system 500 retrieves a consumer characterization vector 562 and a product preference vector 564. Subsequent to retrieval one or more data processing algorithms are applied to update the vectors. An algorithm for updating is illustrated in the flowchart in FIG. 8A. The updated vectors termed herein as new demographic characterization vector 566 and new product preference 568 are returned to consumer profile 560 for storage.

Consumer profiling system 500 can determine probabilistic consumer demographic characteristics based on product purchases by applying heuristic rules 519. Consumer profiling system 500 provides a product ID 514 to heuristic rules records 530 and receives heuristic rules associated with that product. Examples of heuristic rules are illustrated in FIG. 7.

In a preferred embodiment of the present invention, consumer profiling system 500 can determine the applicability of an advertisement to the consumer 100. For determination of the applicability of an advertisement, a correlation request 546 is received by consumer profiling system 500 from advertisements records 540, along with consumer ID 512. Advertisements records 540 also provide advertisement characteristics including an ad demographic vector 548, an ad product category 552 and an ad product preference vector 554.

Application of a correlation process, as will be described in accordance with FIG. 8B, results in a demographic correlation 556 and a product correlation 558 which can be returned to advertisement records 540. In a preferred embodiment, advertiser 144 uses product correlation 558 and demographic correlation 556 to determine the applicability of the advertisement and to determine if it is worth purchasing the opportunity. In a preferred embodiment, pricing policy 570 is utilized to determine an ad price 570 which can be transmitted from consumer profiling system 500 to advertisement records 540 for use by advertiser 144.

Figure 9:
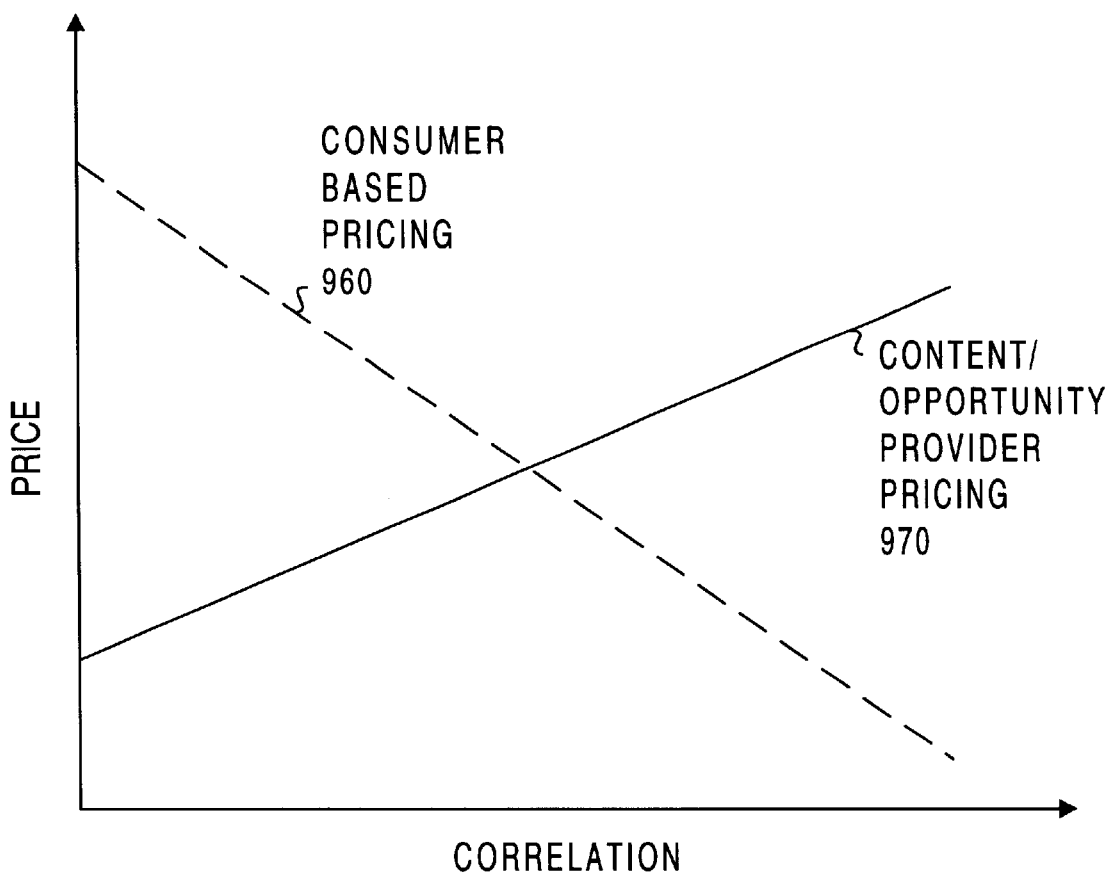
FIG. 9 represents pricing as a function of correlation.

Pricing policy 570 is accessed by consumer profiling system 500 to obtain ad price 572. Pricing policy 570 takes into consideration results of the correlation provided by the consumer profiling system 500. An example of pricing schemes are illustrated in FIG. 9

FIGS. 6A and 6B illustrate pseudocode for the updating process and for a correlation operation respectively. The updating process involves utilizing purchase information in conjunction with heuristic rules to obtain a more accurate representation of consumer 100, stored in the form of a new demographic characterization vector 562 and a new product preference vector 568.

As illustrated in the pseudocode in FIG. 6A the point of purchase data are read and the products purchase are integrated into the updating process. Consumer profiling system 500 retrieves a product demographics vector obtained from the set of heuristic rules 519 and applies the product demographics vector to the demographics characterization vector 562 and the product preference vector 564 from the consumer profile 560.

The updating process as illustrated by the pseudocode in FIG. 6A utilizes a weighting factor which determines the importance of that product purchase with respect to all of the products purchased in a particular product category. In a preferred embodiment the weight is computed as the ratio of the total of products with a particular product ID 514 purchased at that time, to the product total purchase, which is the total quantity of the product identified by its product ID 514 purchased by consumer 100 identified by its consumer ID 512, purchased over an extended period of time. In a preferred embodiment the extended period of time is one year.

In the preferred embodiment the product category total purchase is determined from a record containing the number of times that consumer 100 has purchased a product identified by a particular product ID.

In an alternate embodiment other types of weighting factors, running averages and statistical filtering techniques can be used to use the purchase data to update the demographic characterization vector. The system can also be reset to clear previous demographic characterization vectors and product preference vectors.

The new demographic characterization vector 566 is obtained as the weighted sum of the product demographics vector and and the demographic characterization vector 562.

The same procedure is performed to obtain the new product preference vector 568. Before storing those new vectors, a normalization is performed on the new vectors. When used herein the term product characterization information refers to product demographics vectors, product purchase vectors or heuristic rules, all of which can be used in the updating process. The product purchase vector refers to the vector which represents the purchase of a item represented by a product ID. As an example, a product purchase vector for the purchase of Kellogg's CORN FLAKES in a 32 oz. size has a product purchase vector with a unity value for Kellogg's CORN FLAKES and in the 32 oz. size. In the updating process the weighted sum of the purchase as represented by the product purchase vector is added to the product preference vector to update the product preference vector, increasing the estimated probability that the consumer will purchase Kellogg's CORN FLAKES in the 32 oz. size.

In FIG. 6B the pseudocode for a correlation process is illustrated. Consumer profiling system 500, after receiving the product characteristics and the consumer ID 512 from the advertisement records retrieves the consumer demographic characterization vector 562 and its product preference vector 564. The demographic correlation is the correlation between the demographic characterization vector 562 and the ad demographics vector. The product correlation is the correlation between the ad product preference vector 554 and the product preference vector 564.

In a preferred embodiment the correlation process involves computing the dot product between vectors. The resulting scalar is the correlation between the two vectors.

Figure 10:
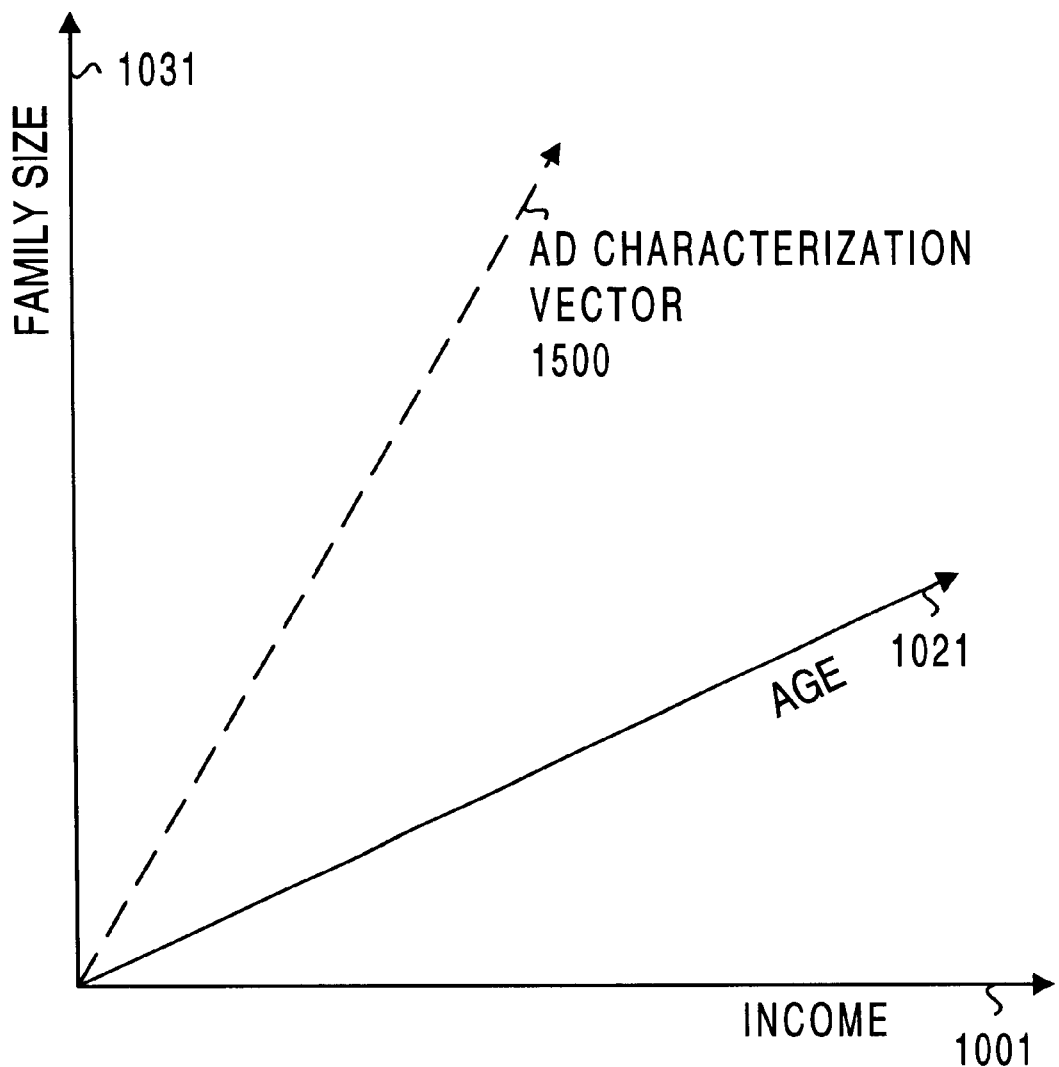
FIG. 10 illustrates a representation of a consumer characterization as a set of basis vectors and an ad characterization vector.

In an alternate embodiment, as illustrated in FIG. 10, the basis vectors which describe aspects of the consumer can be used to calculate the projections of the ad vector on those basis vectors. In this embodiment, the result of the ad correlation can itself be in vector form whose components represent the degree of correlation of the advertisement with each consumer demographic or product preference feature. As shown in FIG. 10 the basis vectors are the age of the consumer 1021, the income of the consumer 1001, and the family size of the consumer 1031. The ad characterization vector 1500 represents the desired characteristics of the target audience, and can include product preference as well as demographic characteristics.

In this embodiment the degree of orthogonality of the basis vectors will determine the uniqueness of the answer. The projections on the basis vectors form a set of data which represent the corresponding values for the parameter measured in the basis vector. As an example, if household income is one basis vector, the projection of the ad characterization vector on the household income basis vector will return a result indicative of the target household income for that advertisement.

Because basis vectors cannot be readily created from some product preference categories (e.g. cereal preferences) an alternate representation to that illustrated in FIG. 2C can be utilized in which the product preference vector represents the statistical average of purchases of cereal in increasing size containers. This vector can be interpreted as an average measure of the cereal purchased by the consumer in a given time period.

The individual measurements of correlation as represented by the correlation vector can be utilized in determining the applicability of the advertisement to the subscriber, or a sum of correlations can be generated to represent the overall applicability of the advertisement.

In a preferred embodiment individual measurements of the correlations, or projections of the ad characteristics vector on the consumer basis vectors, are not made available to protect consumer privacy, and only the absolute sum is reported. In geometric terms this can be interpreted as disclosure of the sum of the lengths of the projections rather than the actual projections themselves.

In an alternate embodiment the demographic and product preference parameters are grouped to form sets of paired scores in which elements in the consumer characterization vector are paired with corresponding elements of the ad characteristics vector. A correlation coefficient such as the Pearson product-moment correlation can be calculated. Other methods for correlation can be employed and are well known to those skilled in the art.

When the consumer characterization vector and the ad characterization vector are not in a standardized format, a transformation can be performed to standardize the order of the demographic and product preferences, or the data can be decomposed into sets of basis vectors which indicate particular attributes such as age, income or family size.

FIG. 7 illustrates an example of heuristic rules including rules for defining a product demographics vector. From the product characteristics, a probabilistic determination of household demographics can be generated. Similarly, the monthly quantity purchased can be used to estimate household size. The heuristic rules illustrated in FIG. 7 serve as an example of the types of heuristic rules which can be employed to better characterize consumer 100 as a result of their purchases. The heuristic rules can include any set of logic tests, statistical estimates, or market studies which provide the basis for better estimating the demographics of consumer 100 based on their purchases.

Figure 8A:
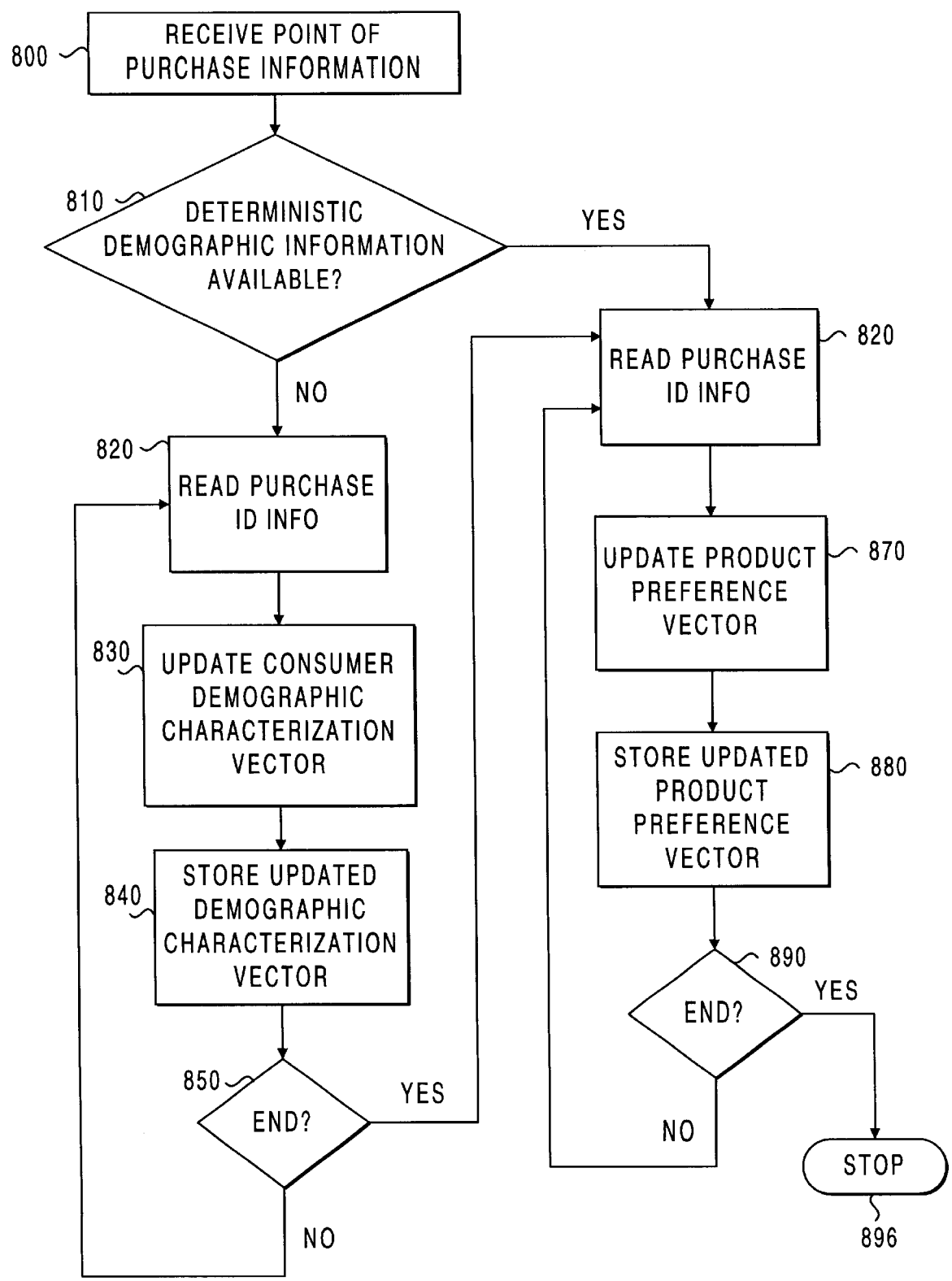
FIGS. 8A and 8B illustrate flowcharts for updating consumer characterization vectors and a correlation operation respectively.

In FIG. 8A the flowchart for updating the consumer characterization vectors is depicted. The system receives data from the point of purchase at receive point of purchase information step 800. The system performs a test to determine if a deterministic demographic characterization vector is available at deterministic demographic information available step 810 and, if not, proceeds to update the demographic characteristics.

Referring to FIG. 8A, at read purchase ID info step 820, the product ID 514 is read, and at update consumer demographic characterization vector step 830, an algorithm such as that represented in FIG. 6A is applied to obtain a new demographic characterization vector 566, which is stored in the consumer profile 560 at store updated demographic characterization vector step 840.

The end test step 850 can loop back to the read purchase ID info 820 if all the purchased products are not yet processed for updating, or continue to the branch for updating the product preference vector 564. In this branch, the purchased product is identified at read purchase ID info step 820. An algorithm, such as that illustrated in FIG. 6A for updating the product preference vector 564, is applied in update product preference vector step 870. The updated vector is stored in consumer profile 560 at store product preference vector step 880. This process is carried out until all the purchased items are integrated in the updating process.

Figure 8B:
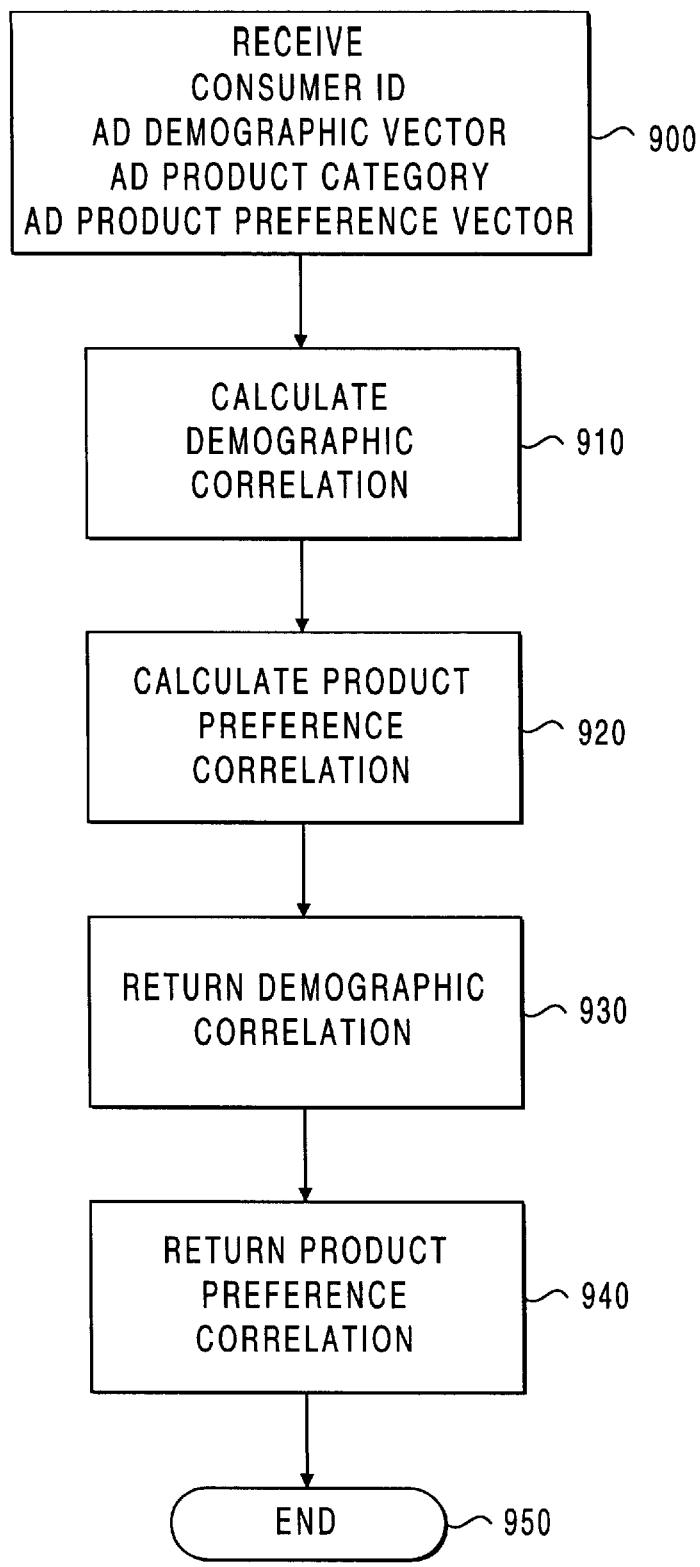

FIG. 8B shows a flowchart for the correlation process. At step 900 the advertisement characteristics described earlier in accordance with FIG. 5 along with the consumer ID are received by consumer profiling system 500. At step 910 the demographic correlation 556 is computed and at step 920 the product preference correlation 558 is computed. An illustrative example of an algorithm for correlation is presented in FIG. 6b. The system returns demographic correlation 556 and product preference correlation 558 to the advertisement records 540 before exiting the procedure at end step 950.

FIG. 9 illustrates two pricing schemes, one for content/opportunity provider 160 based pricing 970, which shows increasing cost as a function of correlation. In this pricing scheme, the higher the correlation, the more the content/opportunity provider 160 charges to air the advertisement.

FIG. 9 also illustrates consumer based pricing 960, which allows a consumer to charge less to receive advertisements which are more highly correlated with their demographics and interests.

As an example of the industrial applicability of the invention, a consumer 100 can purchase items in a grocery store which also acts as a profiler 140 using a consumer profiling system 500. The purchase record is used by the profiler to update the probabilistic representation of customer 100, both in terms of their demographics as well as their product preferences. For each item purchased by consumer 100, product characterization information in the form of a product demographics vector and a product purchase vector is used to update the demographic characterization vector and the product preference vector for consumer 100.

A content/opportunity provider 160 may subsequently determine that there is an opportunity to present an advertisement to consumer 100. Content/opportunity provider 160 can announce this opportunity to advertiser 144 by transmitting the details regarding the opportunity and the consumer ID 512. Advertiser 144 can then query profiler 140 by transmitting consumer ID 512 along with advertisement specific information including the correlation request 546 and ad demographics vector 548. The consumer profiling system 500 performs a correlation and determines the extent to which the ad target market is correlated with the estimated demographics and product preferences of consumer 100. Based on this determination advertiser 144 can decide whether to purchase the opportunity or not.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A computer implemented method for generating a profile of a consumer based on multiple purchases made by the consumer that are accumulated in detailed purchase records of the consumer, the method comprising:
   retrieving the detailed purchase records;
   retrieving product characterization information associated with products included in the detailed purchase records, where in the product characterization information includes a set of heuristic rules defining a probabilistic measure of demographic characteristics of a purchaser of a product; and
   generating a profile of the consumer based on the detailed purchase records and the product characterization information, wherein the profile of the consumer includes a demographic profile of the consumer generated from the detailed purchase records and the set of heuristic rules.

2. The method described in claim 1, wherein the consumer profile includes a product preference profile of the consumer.

3. The method of claim 1, wherein said generating a profile includes generating a first consumer profile, and further comprising storing the first consumer profile in a storage medium.

4. The method of claim 3, wherein said retrieving detailed purchase records includes retrieving first detailed purchase records, and further comprising
   retrieving second detailed purchase records for the consumer, wherein the second detailed purchase records include an inventory of the purchases of the consumer since the first profile was generated;
   retrieving product characterization information associated with products included in the second detailed purchase records;
   generating a second profile of the consumer based on the second detailed purchase records and the associated product characterization information;
   calculating a third profile of the consumer from the first consumer profile and the second consumer profile.

5. The method of claim 4, wherein said calculating a third profile includes calculating the third consumer profile as a weighted average of the first consumer profile and the second consumer profile.

6. The method of claim 5, wherein the weighted average is a ratio of records in the first detailed purchase records to records in the second detailed purchase records.

7. The method of claim 1, wherein the set of heuristic rules are in the form of a vector.

8. The method of claim 1, wherein said generating a profile of the consumer includes generating a product preference profile of the consumer based on the detailed purchase records.

9. The method of claim 8, wherein said generating a product preference profile includes determining a probability of the consumer purchasing a particular product.

10. The method of claim 8, wherein said generating a product preference profile includes determining a consumer preference for a particular brand of a product line.

11. The method of claim 10, wherein the consumer preference is a probabilistic measure based on purchases within the product line contained in the detailed purchase records.

12. The method of claim 8, wherein said generating a product preference profile includes determining a consumer preference for a particular attribute of a product line.

13. The method of claim 12, wherein the particular attribute includes size.

14. The method of claim 1, wherein the multiple purchases made by the consumer are point-of-sale transactions.

15. The method of claim 1, wherein the multiple purchases made by the consumer are accumulated from at least two different locations.

16. The method of claim 1, wherein the consumer profile is in the form of a vector.

17. A computer implemented method for generating a profile of a consumer based on transactions performed by the consumer at multiple locations, the transactions being recorded and accumulated in detailed transaction records for the consumer, the method comprising:
   retrieving the detailed transaction records, wherein the detailed transaction records include an inventory of the recorded transactions of the consumer; and
   generating a profile of the consumer based on the detailed transaction records and a set of heuristic rules associated with transactions within the detailed transaction records, the set of heuristic rules defining a probabilistic measure of demographic characteristics of a person performing the transactions.

18. The method of claim 17, wherein the multiple transactions include point-of-sale purchases.

19. The method of claim 18, wherein the multiple transactions further include television viewing transactions and Internet viewing transactions.

20. The method of claim 17, wherein said retrieving the detailed transaction records includes:
storing the transactions performed by the consumer at multiple locations; and
generating the detailed transaction records based on the stored transactions, wherein the detailed transaction records includes a summary of the transactions over a predetermined time interval.

21. A computer implemented system for generating a profile of a consumer based on multiple purchases made by the consumer that are accumulated in detailed purchase records of the consumer, the system comprising:
means for retrieving the detailed purchase records;
means for retrieving product characterization information associated with products included in the detailed purchase records, wherein product characterization information includes a set of heuristic rules defining a probabilistic measure of demographic characteristics of a purchaser of a product; and
means for generating a profile of the consumer based on the detailed purchase records and the product characterization information, wherein the profile of the consumer includes a demographic profile of the consumer generated from the detailed purchase records and the set of heuristic rules.

22. The system of claim 21 wherein said means for generating a profile generates a first consumer profile, and further comprising a storage medium for storing the first consumer profile.

23. The system of claim 22, wherein said means for retrieving detailed purchase records retrieves first detailed purchase records, and further comprising
means for retrieving second detailed purchase records for the consumer, wherein the second detailed purchase records include an inventory of the purchases of the consumer since the first consumer profile was generated;
means for retrieving product characterization information associated with products included in the second detailed purchase records;
means for generating a second profile of the consumer based on the second detailed purchase records and the associated product characterization information; and
means for calculating a third profile of the consumer from the first profile and the second profile.

24. The system of claim 23, wherein said means for calculating a third profile calculates the third profile as a weighted average of the first profile and the second profile.

25. The system of claim 24, wherein said means for calculating a third profile includes means for determining the weighted average as a ratio of records in the first detailed purchase records to records in the second detailed purchase records.

26. The system of claim 21, wherein said means for generating a profile of the consumer includes means for generating a product preference profile of the consumer based on the detailed purchase records.

27. The system of claim 21, wherein the multiple purchases made by the consumer are point-of-sale transactions.

28. The system of claim 21, wherein the multiple purchases made by the consumer are accumulated from at least two different locations.

29. A computer program embodied on a computer-readable medium for profiling a consumer based on transactions performed by the consumer at multiple locations, the transactions being recorded and accumulated in detailed transaction records for the consumer, the computer program comprising:
a source code segment for retrieving the detailed transaction records, wherein the detailed transaction records include an inventory of the recorded transactions of the consumer; and
a source code segment for retrieving a set of heuristic rules associated with transactions within the detailed transaction records, the set of heuristic rules defining a probabilistic measure of demographic characteristics of a person performing the transactions; and
a source code segment for generating a profile of the consumer based on the detailed transaction records and the set of heuristic rules.

30. The computer program of claim 29, wherein said source code segment for retrieving detailed transaction records retrieves the detailed transaction records from a network interface.

31. The computer program of claim 29, further comprising
a storage medium;
a source code segment for storing the consumer profile on the storage medium as a first consumer profile;
a source code segment for retrieving second detailed transaction records for the consumer, wherein the second detailed transaction records include an inventory of the transactions of the consumer since the first profile was generated;
a source code segment for retrieving product characterization information associated with products included in the second detailed purchase records;
a source code segment for generating a second profile of the consumer based on the second detailed purchase records and the associated product characterization information; and
a source code segment for calculating a third profile of the consumer from the first profile and the second profile.

* * * * *

UNITED STATES PATENT AND TRADEMARK OFFICE
CERTIFICATE OF CORRECTION

PATENT NO.    : 6,298,348 B1
DATED         : October 2, 2001
INVENTOR(S)   : Charles A. Eldering It is certified that error appears in the above-identified patent and that said Letters Patent is hereby corrected as shown below:

<u>Title page,</u>
Item [57], ABSTRACT,
Line 9, delete "access" and replace with -- accessed --;

<u>Column 3,</u>
Line 55, delete "is" and replace with -- this --;

<u>Column 7,</u>
Line 60, delete "a" and replace with -- as --;

<u>Column 9,</u>
Line 3, delete "202" and replace with -- 203 --;

<u>Column 10,</u>
Line 67, delete "and";

<u>Column 13,</u>
Lines 16-17, delete "customer" and replace with -- consumer --;

Signed and Sealed this

Second Day of December, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,298,348 B1 | Page 1 of 1 |
| APPLICATION NO. | : 09/268519 | |
| DATED | : October 2, 2001 | |
| INVENTOR(S) | : Charles Eldering | |

It is certified that error appears in the above-identified patent and that said Letters Patent is hereby corrected as shown below:

In the drawings, Sheet 10, Fig. 5, the reference numeral 572 should be applied to the ad price line labeled 570 which is attached to Pricing Policy 570 and Consumer Profiling System 500;

In the drawings, Sheet 11, Fig. 6A, line 9, delete "HOUSEHOLD DEMOGRAPHICS VECTOR" and replace with --DEMOGRAPHIC CHARACTERIZATION VECTOR--; and Column 10, line 19, delete "ad price 570" and replace with --ad price 572--;

Column 13, line 52, delete "where in" and replace with --wherein--; .

Column 16, line 20, delete "and";

Signed and Sealed this

Twenty-second Day of May, 2007

JON W. DUDAS
*Director of the United States Patent and Trademark Office*